United States Patent [19]
Moore

[11] Patent Number: 6,124,912
[45] Date of Patent: *Sep. 26, 2000

[54] REFLECTANCE ENHANCING THIN FILM STACK IN WHICH PAIRS OF DIELECTRIC LAYERS ARE ON A REFLECTOR AND LIQUID CRYSTAL IS ON THE DIELECTRIC LAYERS

[75] Inventor: Paul McKay Moore, Burlingame, Calif.

[73] Assignee: National Semiconductor Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/872,013

[22] Filed: Jun. 9, 1997

[51] Int. Cl.$^7$ .......................... G02F 1/1335; G02F 1/1333
[52] U.S. Cl. .......................... 349/113; 349/137; 349/138
[58] Field of Search .................................... 349/114, 105, 349/113, 137, 138; 359/584, 585

[56] References Cited

U.S. PATENT DOCUMENTS

| | | | |
|---|---|---|---|
| 3,862,360 | 1/1975 | Dill et al. | 178/7.3 D |
| 3,910,681 | 10/1975 | Elliott et al. | 350/160 |
| 4,024,626 | 5/1977 | Leupp et al. | 29/571 |
| 4,040,727 | 8/1977 | Ketchpel | 350/288 |
| 4,073,571 | 2/1978 | Grinberg et al. | 350/147 |
| 4,103,297 | 7/1978 | McGreivy et al. | 340/324 M |
| 4,185,894 | 1/1980 | Hilton et al. | 350/338 |
| 4,191,452 | 3/1980 | Grinberg et al. | 350/342 |
| 4,239,346 | 12/1980 | Lloyd | 350/334 |
| 4,382,658 | 5/1983 | Shields et al. | 350/334 |
| 4,431,271 | 2/1984 | Okubo | 350/334 |
| 4,470,060 | 9/1984 | Yamazaki | 357/41 |
| 4,602,850 | 7/1986 | DeBenedetti | 350/333 |
| 4,822,144 | 4/1989 | Vriens | 350/339 |
| 4,839,707 | 6/1989 | Shields | 357/23.7 |
| 4,856,019 | 8/1989 | Miyata et al. | 349/114 |
| 5,007,710 | 4/1991 | Nakajima et al. | 350/166 |
| 5,056,895 | 10/1991 | Kahn | 359/87 |
| 5,159,476 | 10/1992 | Hayashi | 359/54 |
| 5,218,472 | 6/1993 | Jozefowicz et al. | 359/584 |
| 5,254,202 | 10/1993 | Kaplan | 156/345 |
| 5,365,355 | 11/1994 | Hastings, III et al. | 359/59 |
| 5,395,662 | 3/1995 | Bischer, Jr. et al. | 427/534 |
| 5,461,501 | 10/1995 | Sato et al. | 359/59 |
| 5,467,216 | 11/1995 | Shigeta et al. | 359/584 |
| 5,473,448 | 12/1995 | Yoshinaga et al. | 359/51 |
| 5,497,025 | 3/1996 | Wong | 257/435 |
| 5,523,862 | 6/1996 | Narita et al. | 359/584 |
| 5,570,213 | 10/1996 | Ruiz et al. | 359/585 |
| 5,648,860 | 7/1997 | Ooi et al. | 349/114 |
| 5,680,231 | 10/1997 | Grinberg et al. | 359/15 |
| 5,706,067 | 1/1998 | Colgan et al. | 349/114 |
| 5,760,853 | 6/1998 | Yamashita | 349/30 |
| 5,760,981 | 6/1998 | Gillich | 359/585 |
| 5,764,324 | 6/1998 | Lu et al. | 349/113 |
| 5,798,805 | 8/1998 | Ooi et al. | 349/114 |
| 5,828,493 | 10/1998 | Bischer, Jr. et al. | 359/584 |
| 5,834,103 | 11/1998 | Bond et al. | 359/585 |
| 5,838,715 | 11/1998 | Corzine et al. | 372/96 |
| 5,889,570 | 3/1999 | Mitsui et al. | 349/114 |
| 5,978,056 | 11/1999 | Shintani et al. | 349/137 |

FOREIGN PATENT DOCUMENTS

| | | | |
|---|---|---|---|
| 3-208018 | 9/1991 | Japan | 349/138 |

OTHER PUBLICATIONS

F. Sato et al., "L1.2: High Resolution and Bright LCD Projector with Reflective LCD Panels," *SID 97 Digest*, 1997, pp. 997–1000.

N. Sugiura et al., "42.1: Designing Bright Reflective Full-—Color LCDs Using an Optimized Reflector," *SID 97 Digest*, 1997, pp. 1011–1014.

*Primary Examiner*—Walter Malinowski

[57] ABSTRACT

Applying layers of dielectric material to a reflective conductive surface of an integrated circuit, increases the reflectance of the surface. The layers of dielectric material alternate between high and low indices of refraction. To enable incident light waves to undergo a uniform phase change as the waves pass between the dielectric materials, the thickness of each of the layers of dielectric material is established such that each of the layers of dielectric material have a substantially equal optical thickness. As a result, when he dielectric layers reflect incident light waves, the reflected light waves constructively interfere to increase the reflectance of the surface of the integrated circuit.

29 Claims, 6 Drawing Sheets

REFLECTANCE ENHANCING THIN FILM STACK IN WHICH PAIRS OF DIELECTRIC LAYERS ARE ON A REFLECTOR AND LIQUID CRYSTAL IS ON THE DIELECTRIC LAYERS

BACKGROUND OF THE INVENTION

1. Field of the Invention

The present invention relates to liquid crystal display devices and in particular to liquid crystal display devices having reflectance enhancing thin films.

2. Related Art

Liquid crystal displays (LCDs) are becoming increasingly prevalent in high-density projection display devices. These conventional high density projection-type color display devices typically include a light source which emits white light. Dichroic mirrors separate the white light into its corresponding red, green and blue (RGB) bands of light. Each of these colored bands of light is then directed toward a corresponding liquid crystal light valve which in accordance with the image to be projected, either permits or prevents transmission of light there through. Those RGB bands of light which are permitted to be transmitted through the light valves are then combined by dichroic mirrors or a prism. A projection lens then magnifies and projects the image onto a projection screen.

The liquid crystal light valves used in the projection system include a matrix array of pixel electrodes coupled to corresponding thin film transistors. Driving circuits connected to the thin film transistors selectively switch the thin film transistors in the pixel array of the light valve on and off. A voltage applied to the pixel electrode via the thin-film transistor will vary the direction of orientation of the liquid crystal material on the pixel electrode and will modulate the light traveling though the liquid crystal. When no voltage is applied to the pixel electrode, the light transmitted through the light valve is either unchanged if the cells contain twisted nematic liquid crystal, or scattered if the cells contain polymer dispersed liquid crystal. Once a voltage is applied, the liquid crystal's optical characteristics are modified and the light traveling through the light valve cell is changed.

Conventional liquid crystal light valves are formed by confining a thin layer of liquid crystal material between a top plate and a bottom plate. The top plate is typically a glass substrate having one large electrode on a surface adjacent to the liquid crystal material. The bottom plate is typically a silicon substrate which couples to reflective electrodes on a surface adjacent to the confined liquid crystal material. These reflective electrodes define the plurality of above-mentioned pixels organized in a matrix array of rows and columns.

Projection systems using light valve devices are capable of high resolution and brightness. However, it is desirable to provide liquid crystal light valves which provide the brightest possible images with a high level of picture quality and a high level of picture reproducibility and which can tolerate high levels of light without reaching an operating temperature that requires extensive external cooling means to maintain an operating temperature that will not cause the liquid crystal material to fail. Furthermore, although the conventional projection system has many advantages such as being light weight and having a compact size, total light output (brightness), contrast ratio (amount of light reflected when the light valve pixel state is fully on divided, by amount of light reflected when the pixel state is off) and conversion of absorbed light to heat, remain significant impediments to high-quality picture display.

Picture definition is a general term for describing the general characteristic of crispness, sharpness, or image-detail visibility in a picture. Picture definition is dependent upon the contrast ratio, in that, the higher the contrast ratio the crisper the image. As a result, contrast ratio is an important characteristic of a picture-image medium.

To improve the contrast ratio, and the brightness of the image highly reflective metal has been provided on the surface of integrated circuit memory chips as explained in U.S. Pat. No. 5,497,025, incorporated herein by reference. In these conventional chips, a reflective metal reflector plate includes three reflective metal layers. The bottom layer of the reflector plate structure is formed of aluminum Al. The surface of this bottom layer is too rough a surface for reflection, so another metal layer formed of Ti (titanium) or TiN (titanium nitride), or the like, is deposited on the aluminum Al. The top layer of the metal reflector structure is formed of cold aluminum. This top metal layer is etched.

A passivation layer is added as a final layer. A two-part etch is performed to expose the metal reflector plate top surface. After conventional lithography and etching to define the area to be etched, a reactive ion etch is performed to reduce the passivation layer thickness in the region above the metal reflector plate. The second etch is a wet etch to remove the remainder of the passivation layer over the metal reflector plate.

The highly reflective plate disclosed in the above-referenced patent increases the reflectance of the metal surface to approximately 80%. This increase in reflectance corresponds to a contrast ratio of 40. When a highly reflective metal reflector plate is not patterned, the reflectance of the metal reflector may be increased to approximately 90%.

One problem with this highly reflective metal reflector plate, however, is that the processing of the aluminum metal plate produces less reflectance. The processes of etching the metal, stripping the photoresist, depositing the passivation layer, and etching the passivation away, all roughen the surface of the highly reflective metal reflector plate. This roughness creates low reflectance and consequently a reduction of the light available to create the projected image.

Thus, a need exists to improve the contrast ratio and the brightness of an image created with reflective mode displays. Fulfilling this need in turn allows the creation of a smaller pixel size. Consequently, the net benefit will allow for the production of high quality picture definition, and the minimization of the absorption of light projected onto the light valve by maximizing its reflectance.

SUMMARY OF THE INVENTION

Figure 1:
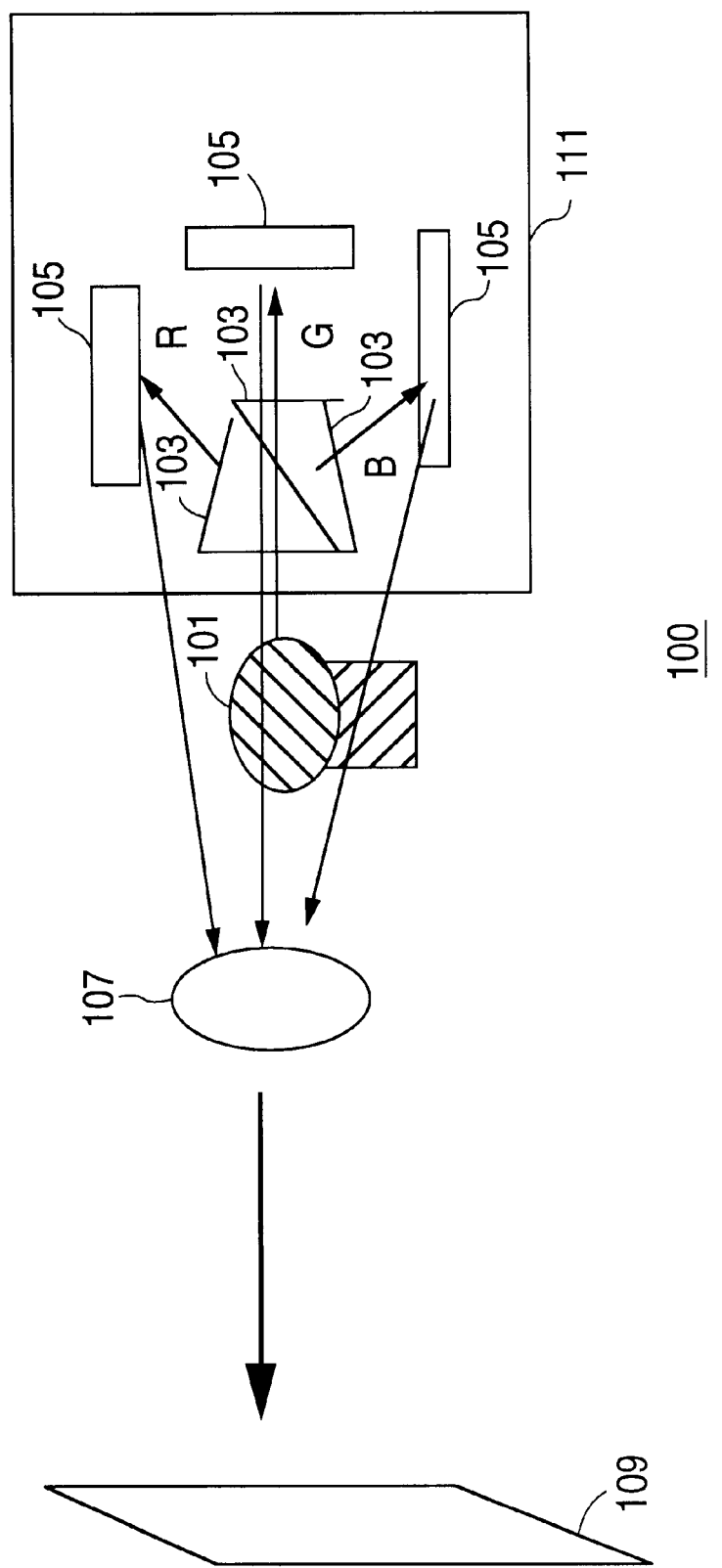
FIG. 1 illustrates a projection system in accordance with the present invention.

A reflectance enhancing thin film stack is formed on a reflective metal surface of an integrated circuit, such as a pixel. The thin film stack is formed from one or more dielectric layers, such as silicon nitride and silicon dioxide. Each of the dielectric layers reflects an incoming light wave, such that the number of reflected waves corresponds to the number of dielectric layers formed on the metal surface, plus the reflected wave reflected by the reflective metal surface. Thus, by increasing the number of dielectric layers, the reflectance of the surface of the integrated circuit is enhanced.

In one embodiment, two dielectric layers are applied formed on a reflective conductive surface, such as a reflective metal, of the integrated circuit to increase the reflectance. The dielectric layers are chosen such that the bottom dielectric layer formed on the reflective metal layer has a lower index of refraction than the top dielectric layer formed on the bottom dielectric layer. As a result, when the light wave, traveling at a zero (0) degree phase angle (as an arbitrary reference), incident on the top dielectric layer hits the boundary between air and the top dielectric layer, which has a higher index of refraction than air, the reflected wave shifts phase. Part of the incident light wave is refracted and travels into the top dielectric layer where it is reflected at the boundary between the top and bottom dielectric layers. Finally, a portion of the refracted wave is refracted again and travels into the bottom dielectric layer where it is reflected at the surface of the reflective metal layer. The thickness of the top and bottom dielectric layers are determined such that the optical thickness of both dielectric layers is substantially equal, thereby permitting each of the reflected waves to constructively interfere. This constructive interference increases the reflectance of the surface of the integrated circuit.

In a second embodiment, a quarterwave stack having four dielectric layers is formed on the surface of the pixel integrated circuit. The dielectric layers are formed such that the dielectric layers alternate between a high index of refraction and a low index of refraction. Again, the thickness of each dielectric layer is adjusted such that the optical thickness of the four dielectric layers is substantially equal, causing the light waves to undergo virtually identical phase shifts as they pass between dielectric layers. In this way, the reflected light waves constructively interfere to increase the reflectance of the surface.

In a third embodiment, the thickness of the dielectric layers is adjusted such that only one of the primary colors (red, green or blue) is reflected. In this way, a red pixel, a green pixel or a blue pixel is created, thereby eliminating the need for a dichroic filter to separate the white light into the primary colors. When the dichroic filter is eliminated, the losses associated with the filter disappear, which has the effect of reducing the power required to operate the pixel.

There are several advantages to applying the thin films to the reflective metal layer. First, with the use of thin films, the reflectance of the surface of the integrated circuit is greater than the reflectance of a bare reflective metal surface. As a result, the contrast ratio increases, the brightness increases, and the heat absorbed by the light valve decreases. Second, the reflective layers provide a passivation layer for the metal surface, protecting it from contamination and exposure.

These and other features and advantages of the present invention will be understood upon consideration of the following detailed description of the invention and the accompanying drawings.

DETAILED DESCRIPTION OF THE PREFERRED EMBODIMENT

FIG. 1 illustrates a projection-type imaging system 100. The projection-type imaging system 100 includes a light source 101. White light is emitted from light source 101. Once the light hits the prism 103, the light is separated into its red, green and blue colored bands of light by dichroic filter coatings. Colored light is directed toward liquid crystal display (LCD) light valves 105. When reflected off light valve 105, the colored light waves travel back through the prism and through projection lens 107. Lens 107 magnifies and projects the synthesized color image onto projection screen 109.

Figure 2:
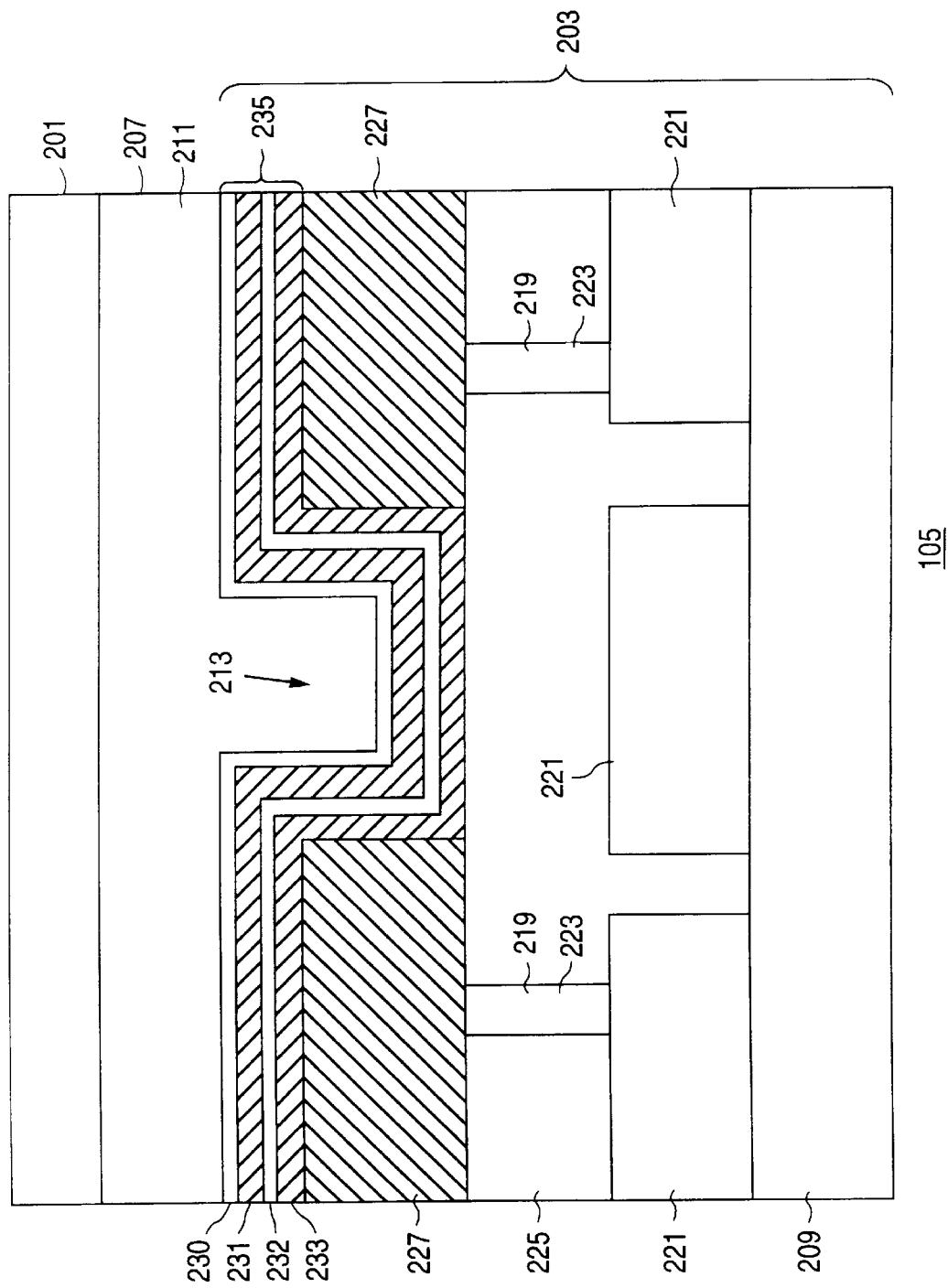
FIG. 2 illustrates a cross-sectional area of a reflective material in accordance with the present invention.

A cross-section of a light valve 105 is shown in FIG. 2. The LCD light valve 105, includes a first substrate, typically a glass plate 201, formed as the top surface. The glass plate 201 is bonded to a silicon die which contains a metal oxide semiconductor (MOS) substrate 203 by a sealing member (not shown) which serves to enclose a display area and separate the glass plate 201 from the silicon die 203 by a predetermined minute distance. Thus, the light valve 105 has an inner cavity 207 defined by the glass plate 201 and the silicon die 203. Liquid crystal material 211, such as PDLC, is sealed in this inner cavity 207.

In a preferred embodiment, three metal layers form the metal reflector structure. As shown in FIG. 2, layer 209 formed by front end processing includes formation of a first metal layer (not shown) on a semiconductor substrate (not shown), and a first intermediate dielectric layer (not shown), such as a TEOS (tetra ethyl ortho silane) layer, deposited over and between the first metal layer. Another metal (not shown), typically tungsten, is formed in the first intermediate dielectric layer for interconnection of the first metal layer to the silicon substrate, and a second dielectric layer (not shown), such as TEOS, is formed on the top surfaces of the first metal layer and the first intermediate dielectric layer.

A second metal layer 221 is deposited on layer 209 formed in the front end processing. A third dielectric layer 225 is formed on the top surface of the second metal layer 221 and the second intermediate dielectric layer. Vias 219 are formed in the third dielectric layer 225 for interconnection of the second metal layer 221 to a third metal layer 227. A metal 223, typically a tungsten plug fills the via 219 during deposition. The top metal layer 227 of the metal reflector structure may be formed of pure aluminum metal, or an aluminum copper (Cu) material. As a result, the top metal layer 227 is a highly reflective film.

Figure 3:
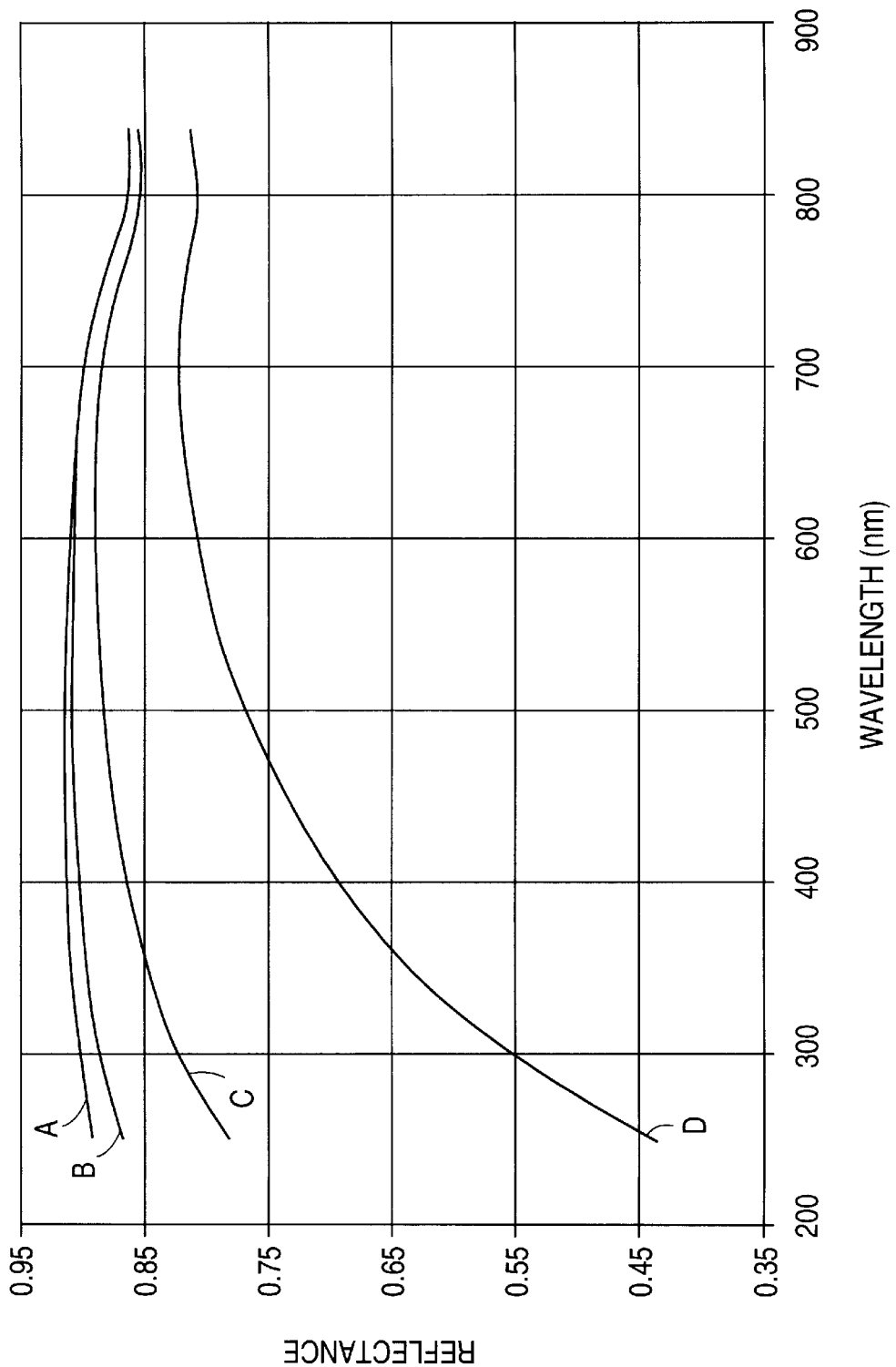
FIG. 3 illustrates a theoretical effect of roughness on reflectance of a metal surface.

At this stage in the processing, the reflectance of light valve 105 corresponds to the top reflecting metal layer 227. Although metal is used as the top reflecting layer 227, it will be appreciated that other reflective conductive materials are also suitable. When an aluminum copper (AlCu) metal is used, this metal has a reflectivity between 75–90% and provides a contrast ratio of about 45. The reflectivity curve of aluminum copper metal (AlCu) versus wavelength is shown in FIG. 3. The smoother the surface of a bare metallic substrate, the higher the reflectance. As FIG. 3 illustrates, when the root mean square (RMS) roughness of the reflecting metal 227 is 3.8 nanometers, the reflectance is approximately 90% in the visible spectrum (wavelengths of 500–600 nm), as shown by curve A. But, when the RMS roughness increases to about 4.9 nm, the reflectance decreases just a little as shown by curve B. When the RMS roughness increases to 8.15 nm, the reflectance decreases to approximately 89% as shown by curve C. Finally, when the RMS roughness increases to 17.2 nm, the reflectance of reflecting metal 227 decreases significantly to between approximately 76% and 80% as shown by curve D.

Referring again to FIG. 2, to increase the reflectance of aluminum, a system of thin films 230–233 can be applied to top metal layer 227, the reflecting layer. Application of these thin films 230–233 to the reflective metal layer 221 forms a protective passivation layer for the reflective metal, as well as increases the reflectance of the surface of the reflective top metal layer 227.

As shown in FIG. 2, the thin films 230–233 are multiple dielectric layers. These layers 230–233 are formed of material such as silicon nitride ($Si_3N_4$) and silicon dioxide ($SiO_2$). In one embodiment of the present invention, a silicon dioxide dielectric material 233 is deposited on the reflecting metal layer 227. Then, a layer 232 of silicon nitride is deposited on the silicon dioxide layer 233. Subsequent layers 230, 231 alternate between $Si_3N_4$ and $SiO_2$, respectively. In theory, the more dielectric layers added, with an interference scheme, wherein the waves reflecting off the surfaces of the dielectric layers constructively interfere, the closer to 100% reflection. In reality, however, as the number of dielectric layers increases, defects are introduced. As a result, the reflectance begins to deteriorate.

Use of these thin films 230–233 are an advantage to the conventional light valves because the surface of the light valve 105 is smoother. Since the passivation layer 235 formed by films 230–233, is not stripped from the surface of the reflecting metal layer 227, as in conventional light valves, the surface of the reflective metal is not roughened by processing required to remove the passivation layer 235.

Figure 4:
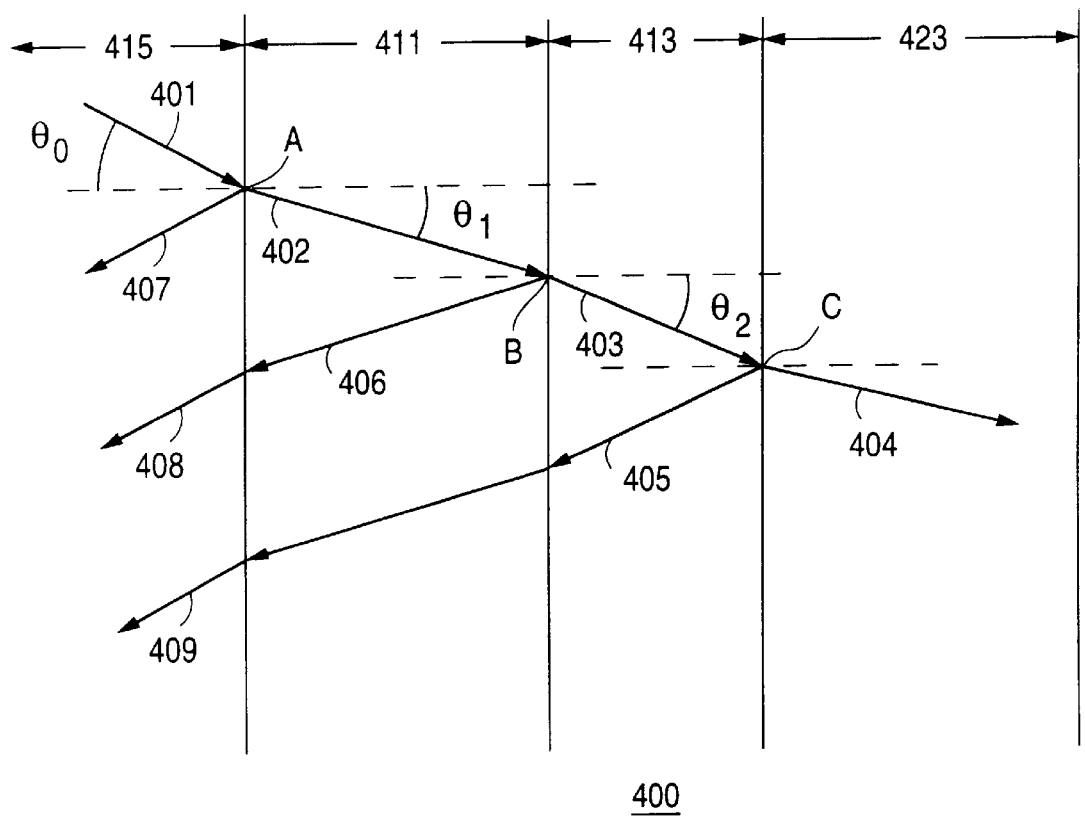
FIG. 4 illustrates a reflection diagram in accordance with the present invention.

Referring again to FIG. 1, when light from light source 101 is incident to light valve 105, the light waves from dichroic prism 103 are directed straight at, or normal to, light valve 105. FIG. 4 illustrates a reflection diagram of a surface of an integrated circuit 400 formed by two dielectric layers 411, 413 positioned on a metallic substrate 423. For illustrative purposes, the incident light waves 401–403 and reflected light waves 405–407 are drawn at an angle to distinguish each of the waves. When the incident light wave 401 travels from air 415 to the surface of dielectric layer 411, part of the incident light wave 401 is reflected at A (reflected wave 407) on the top surface of dielectric layer 411, while the remainder is refracted as it enters dielectric layer 411, generating refracted wave 402. Part of this refracted wave 402 is reflected at B (reflected wave 406) on the surface of dielectric layer 413. The remainder of this refracted wave 402 is refracted as it enters dielectric layer 413, generating refracted wave 403. Part of the refracted wave 403 is reflected at C (reflected wave 405) while the remainder is refracted into metallic substrate 423. The amount of refraction depends on the wavelength of incident light wave 401.

Each of the reflected light waves 407–409 emanating from the surface of dielectric layer 411, interfere with one another. The part of the incident light wave 401 reflected at B on the top surface of dielectric layer 413, must travel further by the extra distance ABC than the part of incident light wave 401 reflected at A on the top surface of dielectric layer 411. When the distance ABC is equal a whole number of wavelengths, the two waves are in phase and interfere constructively, causing bright light. But when the distance ABC equals ½, 3/2, etc., of a wavelength then the two waves are out of phase and destructive interference occurs. To optimize the reflectance of the metallic substrate 423, it is desirable to create phase changes in the light waves, so that the reflected light waves 407–409 constructively interfere with each other. For example, it is desirable that reflected wave 407 from the first dielectric layer 411 be in phase with the reflected wave 408 from the second dielectric layer 413. This constructive interference increases the reflectance of the surface of pixel circuit 400.

As can be seen from equation (1) below, the phase of the light waves is determined by the wavelength of the light, the index of refraction and thickness.

$$\Phi_v = (2\pi * n_v * d_v / \lambda) * \cos(\theta_v) \quad (1)$$

where v is the dielectric layer, $\Phi_v$ is the phase of the light wave, $n_v$ is the index of refraction of the dielectric layer, $\lambda$ is the wavelength of the light wave, $d_v$ is the thickness of the dielectric layer, and $\theta_v$ is the angle of refraction.

The angle of refraction $\theta_v$ can be determined using Snell's law.

$$\theta_{v-1} * \sin(\theta_{v-1}) = \theta_v * \sin(\theta_v) \quad (2)$$

where $\theta_{v-1}$ is the angle of incidence.

Using equations (1) and (2), the thickness of the dielectric layers can be adjusted to provide a ninety (90) degree phase shift when light waves pass through a medium (e.g., air 415 to first dielectric layer 411). Referring again to FIG. 1, since light coming from the prism 103 is aligned to light valve 105 in such a manner that all light is directed normal to the surface of reflecting metal 523, which is the mirror of light valve 105, the angle of incidence is zero (0) degrees, as shown in FIG. 4. Therefore, when a phase of $\pi/2$ is substituted for $\Phi_v$, $$\pi/2 = (2\pi * n_v * d_v / \lambda) * \cos(0) \quad (3)$$

then, $$\lambda/4 = n_v * d_v \quad (4)$$

As a result, the elements of design for the thin films are the index of refraction and thickness of the thin film.

Figure 5:
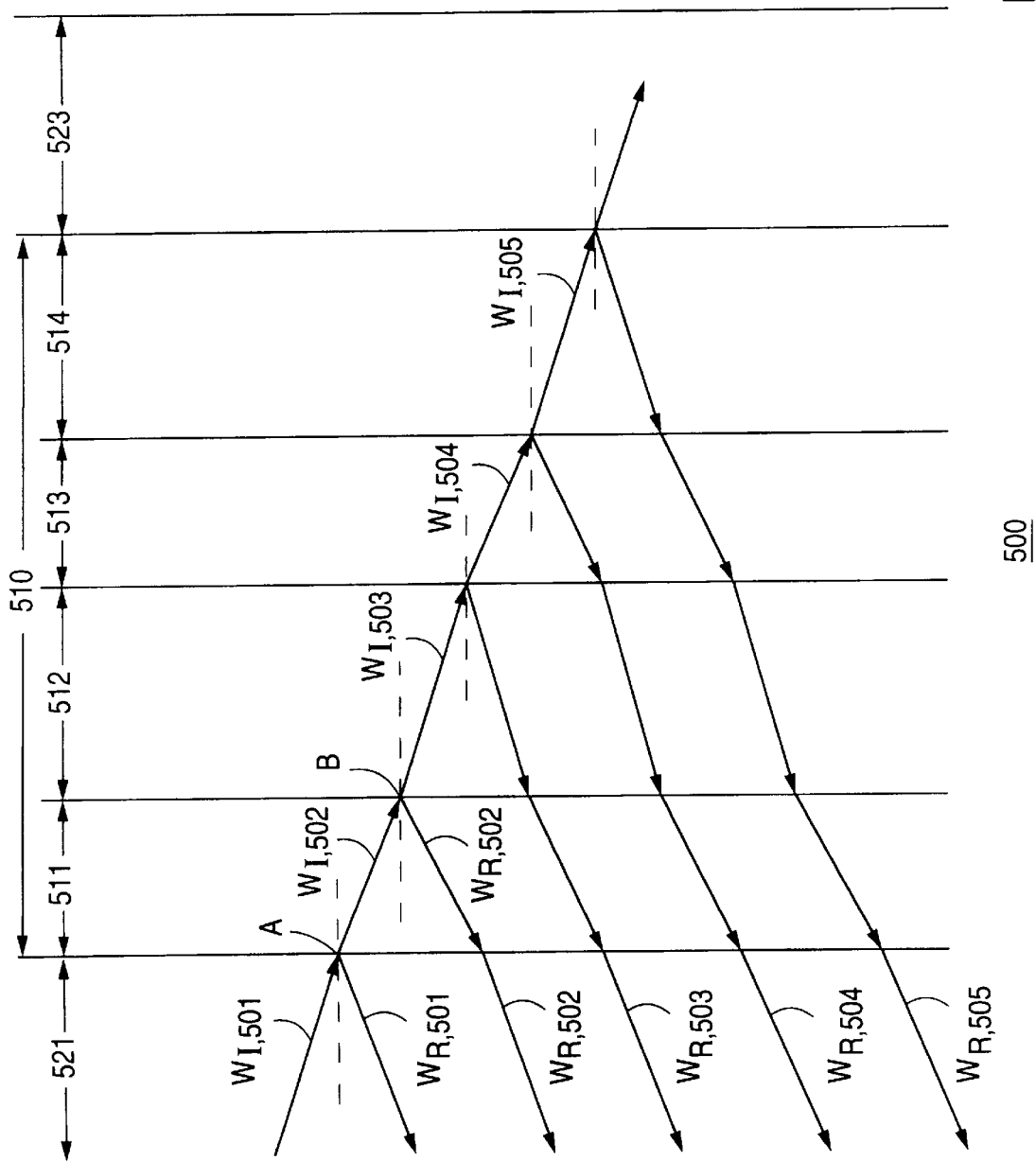
FIG. 5 illustrates a second reflection diagram in accordance with the present invention.

In the embodiment of the present invention shown in FIG. 5, the reflectance of pixel integrated circuit 500 can be increased further by using quarter wave stack 510 formed on reflecting metal 523. In this embodiment, the optical thickness ($n_v * d_v$) of each of the layers 511–514 is adjusted to be equal to one fourth (¼) of the center wavelength of the visible spectrum (550 nm).

To achieve constructive interference, the quarter wave stack 510 is designed such that as light waves pass through each of the dielectric layers 511–514, the light waves $W_{I,501}$–$W_{I,505}$ and $W_{R,501}$–$W_{R,505}$ each undergo a ninety (90) degree phase shift. As a result, the resulting reflected waves emerging into the incident medium are all in phase with respect to the initial light wave $W_{I,501}$.

These phase changes are created as the light waves travel from a medium having one index of refraction to a medium having a different index of refraction. As a result of the principle of causality, the speed of the light waves change as they propagate through dielectric layers 511–514. To equalize the optical thickness ($n_v * d_v$) of each of the layers 511–514, using equation (1), those dielectric layers having a lower index of refraction are thicker than those dielectric layers having a higher index of refraction. This enables the ninety (90) degree phase shift of dielectric layers 511–514 to be maintained. In addition, when the light waves hit a boundary between a medium having a lower index of refraction than the medium to which it is traveling, the light wave is reflected and for nonabsorptive media a phase shift of 180 degrees occurs. Conversely, when the light waves travel from a medium having a higher index of refraction than the medium to which it is traveling, the light wave is reflected at a phase angle of zero (0) degrees for nonabsorptive media.

As shown in FIG. 5, the dielectric layers 511–514 alternate between silicon nitride ($Si_3N_4$) and silicon dioxide ($SiO_2$) layers. Thus, the silicon nitride layers 511, 513 having a higher index of refraction than silicon dioxide layers 512, 514, have a thickness (e.g., 60 nm) smaller than the thickness of the silicon dioxide dielectric layers 512, 514 (e.g., 80 nm).

In this embodiment, the dielectric layers 511–514 are formed in a high-low configuration. In this alternating configuration, the index of refraction of the top dielectric layer 511 is higher than the index of refraction of the dielectric layer 512 directly beneath it, and the index of refraction of the subsequent dielectric layer 513 is higher than the index of refraction of the dielectric layer 514 directly beneath it. Similarly, as shown in FIG. 2, since the index of refraction of the PDLC is higher than the index of refraction of silicon dioxide, a silicon nitride dielectric layer 230 can be formed as the top dielectric layer to achieve the alternating high-low configuration.

The configuration of the dielectric layers 511–514 may be determined by the material above top dielectric layer 511. For example, in this embodiment, since the index of refraction of air 521 is lower than the index of refraction for silicon dioxide, silicon nitride is chosen as the top dielectric layer 511. In this way the alternating dielectric layer configuration can be achieved to create reflection that is in phase with the reflection at the PDLC/silicon nitride layer. This embodiment reduces the number of dielectric layers required to achieve reflectance on the order of 93–98%. Conversely, an embodiment which implements silicon dioxide as an interface to the PDLC would require a greater number of alternating dielectric layers to achieve equivalent reflectance. Due to film imperfections, and the importance of manufacturing throughput to the application, the number of dielectric layers 511–514 should be minimized.

As a result, operation of the quarter wave stack 510 is as follows. Light wave $W_{I,501}$, incident on top of the first dielectric layer 511 formed of silicon nitride, is reflected at point A, generating reflected wave $W_{R,501}$. Since the incident wave $W_{I,150}$, traveling at a zero (0) degree phase angle, by convention, hits the boundary from an external medium, 521, such as air, to dielectric layer 511, which has a higher index of refraction than air, reflected wave $W_{R,501}$ undergoes a shift of 180 degrees.

As light wave $W_{I,502}$ enters the first dielectric layer 511, it decreases in speed since the index of refraction of the silicon nitride layer 511 is greater than that of air 521. This decrease in speed causes a 90 degree phase shift. Once light wave $W_{I,502}$ hits the boundary between first dielectric layer 511 and second dielectric layer 512, at point B, it is reflected at zero (0) degrees. This phase change occurs since the index of refraction for first dielectric layer 511 is higher than the index of refraction of second dielectric layer 512. Thus, so far the light wave $W_{I,502}$ has shifted 90 degrees. Then, when reflected wave $W_{R,502}$ passes from the first dielectric layer 511 into air 521, the speed of the reflected wave $W_{R,502}$ increases since the index of refraction of air 521 is less than the first dielectric layer 511. This increase in speed causes another 90 degree phase shift, which results in a total phase shift of 180 degrees. As a result, reflected wave $W_{R,502}$ is in phase with $W_{R,501}$, since both have been shifted 180 degrees.

Continuing the above analysis for each of the light waves $W_{I,503}$–$W_{I,505}$ and $W_{R,503}$–$W_{R,505}$, demonstrates that each of the reflected waves $W_{R,503}$–$W_{R,505}$ is phase shifted one hundred eighty (180) degrees. Since all of the reflected light waves $W_{R,501}$–$W_{R,505}$ are changing by 180 degrees, as a result of the periodic structure, then all of the reflected light waves $W_{R,501}$–$W_{R,505}$ are in phase. As a result, all five light waves $W_{R,501}$–$W_{R,505}$ interfere constructively to provide more reflectance than just one light wave reflecting from the surface of metal layer 523 could provide.

Figure 6:
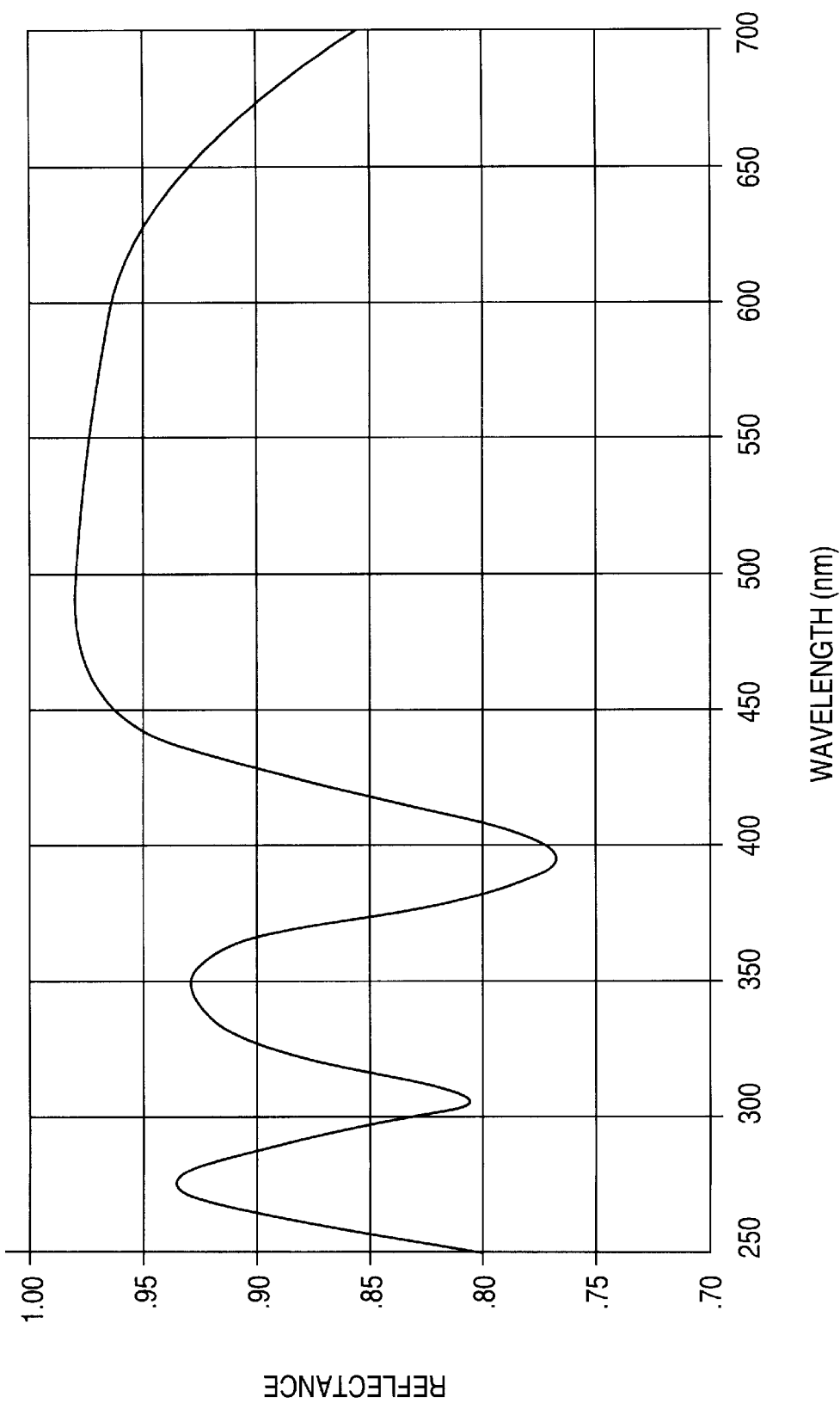
FIG. 6 illustrates an effect of roughness on reflectance of a surface in accordance with the present invention.

As shown in FIG. 6, the effect of forming quarter wave stack 510 on metallic substrate 523 increases the reflectance of the surface to approximately 96%–97% in the visible spectrum, compared to approximately to the 76%–90% reflectance achieved with only the reflecting metal 227 as shown in FIG. 3. The 96% to 97% increase in reflectance corresponds to a contrast ratio of approximately 48, when the amount of light reflected off of reflectance system is limited to 2%, by the PDLC. This is a substantial improvement over the conventional contrast ratio of 40, for systems employing a bare metal as the reflective surface.

In an alternate embodiment, the four dielectric layers 511–514 are deposited on pixel circuit 500 in a different manner. Rather than forming all of the dielectric layers 511–514 after the processing of the reflective conductive layer, such as reflective metal layer 523, one dielectric layer 514 is added to the metal layer 523 before the processing. According to this operation, reflective metal layer 523 is formed of cold aluminum, deposited by sputtering Al cold at temperature of approximately 50° C. Typically, this aluminum layer is either pure aluminum or AlCu to maintain a high reflectance of the layer 523. Next, a dielectric layer 514, such as silicon dioxide $SiO_2$, is deposited on the reflective metal 523, which comprises pixel integrated circuit 500. Then, the conventional processing is carried out.

An example of one such conventional processing is explained as follows. The desired plate is defined by a photoresist formed by conventional lithography. The dielectric layer 514 (e.g., $SiO_2$) is etched and then metal layer 523 is etched. The photoresist is then stripped off using standard stripping techniques such as a series of plasma ash. Upon removal of the photoresist is an array of oxide on top of pixel circuit 500. At this point, the three dielectric layers 512–14 are added to form a passivation layer.

In another alternate embodiment, the thickness of the films 511–514 can be adjusted to reflect only one of the primary colors, red, green or blue. Variations in the thickness of the dielectric layers and the index of refraction of the dielectric layers alters the distance light waves travel and therefore affects the color of light most strongly reflected. By stacking the thin films 511–514 on top of the pixel circuit 500 the reflectance of the light wave $W_{I,501}$ is tuned. In this way, a red, a green or a blue pixel or pixel array is created. As more dielectric layers 511–514 are added the reflectance increases, but the bandwidth narrows. Thus, rather than the broad bandwidth response achieved with the quarter wave stack 510, a narrow bandwidth response is achieved. This is in effect a bandpass filter for each color band of light. This embodiment eliminates the need for the dichroic filter 102 on the prism 103, which in turn eliminates the losses associated with dichroic filter 102, which in turn reduces the power needed for lamp illuminating the pixel circuit 500.

There are several benefits of using thin films formed of a plurality of dielectric layers, to optimize the performance of the transmittance and reflectance of silicon type devices, such as pixels. First, the total reflectance of the pixel is increased by constructively interference of the waves reflecting off the dielectric layers. Second, the dielectric layers passivate the surface of the integrated circuit and thereby provide increased reliability. By passivating the surface of the reflective substrate such as metal, the dielectric layers protect the reflective metal from external contamination and provide a passive surface to contact with the poly dispersed liquid crystal (PDLC). Also, the thin films provide a barrier to the diffusion of impurities into the silicon die.

Various other modifications and alterations in the structure and method of operation of this invention will be apparent to those skilled in the art without departing from the scope and spirit of this invention. Although the invention has been described in connection with specific preferred embodiments, it should be understood that the invention as claimed should not be unduly limited to such specific embodiments.

What is claimed is:

1. An apparatus including a highly reflective surface formed on a surface of an integrated circuit, said highly reflective surface comprising:

a reflective conductive layer disposed on a surface of an integrated circuit;

one or more pairs of dielectric layers consecutively arranged on said reflective conductive layer; and liquid crystal material disposed directly upon said one or more pairs of dielectric layers.

2. The apparatus of claim 1, wherein said reflective conductive layer comprises metal.

3. The apparatus of claim 1, wherein at least one pair of said one or more pairs of dielectric layers comprise a silicon dioxide layer and a silicon nitride layer.

4. The apparatus of claim 1, wherein each of said one or more pairs of dielectric layers has a respective optical thickness which creates a substantially ninety degree phase shift when said light waves are refracted by each of said plurality of dielectric layers.

5. The apparatus of claim 1, wherein each pair of said one or more pairs of dielectric layers comprise silicon nitride and silicon dioxide layers.

6. The apparatus of claim 1, further comprising:

a metal interconnect between the integrated circuit and the reflective conductive layer.

7. The apparatus of claim 6, wherein the metal interconnect comprises aluminum.

8. The apparatus of claim 1, wherein the one or more pairs of dielectric layers comprise alternating layers of silicon dioxide and silicon nitride consecutively arranged.

9. The apparatus of claim 1, wherein the one or more pairs of dielectric layers comprise alternating layers of a first dielectric material having a first index of refraction and a second dielectric material having a second index of refraction consecutively arranged, wherein the first index of refraction is higher than the second index of refraction.

10. The apparatus of claim 1, wherein each of the one or more pairs of dielectric layers has a respective optical thickness and the optical thicknesses are determined such that at least one of a blue color, a red color and a green color is reflected.

11. The apparatus of claim 1, wherein each of the one or more pairs of dielectric layers has a respective optical thickness and the optical thicknesses are determined such that said one or more pairs of dielectric layers and said reflective metal layer reflect light waves from an incident light beam, which constructively interfere to increase a reflectance of said surface of said integrated circuit.

12. The apparatus of claim 1, wherein the one or more pairs of dielectric layers comprises four dielectric layers consecutively arranged, each of the four layers having an optical thickness approximately equal to one-fourth of a center wavelength of a visible spectrum.

13. An apparatus including a light valve, said light valve comprising:

an integrated circuit;

one or more reflective metal layers disposed on said integrated circuit, the one or more reflective metal layers having an upper reflective conductive layer;

one or more pairs of dielectric layers consecutively arranged on said upper reflective conductive layer; and liquid crystal material disposed directly upon a top dielectric layer of said one or more pairs of dielectric layers.

14. The apparatus of claim 13, wherein each of said one or more pairs of dielectric layers reflect light waves from an incident light beam, such that the reflected light waves constructively interfere to increase a reflectance of said surface of said integrated circuit.

15. The apparatus of claim 14, wherein said one or more pairs of dielectric layers comprise two pairs of dielectric layers, wherein one dielectric layer of each pair of dielectric layers has a thickness between 700 and 900 Angstroms.

16. The apparatus of claim 14, wherein said one or more pairs of dielectric layers comprise two pairs of dielectric layers, wherein one dielectric layer of each pair of dielectric layers has a thickness between 500 and 700 Angstroms.

17. The apparatus of claim 13, further comprising:

a metal interconnect between the integrated circuit and the reflective conductive layer.

18. The apparatus of claim 17, wherein the metal interconnect comprises aluminum.

19. The apparatus of claim 13, wherein the one or more pairs of dielectric layers comprise alternating layers of silicon dioxide and silicon nitride consecutively arranged.

20. The apparatus of claim 13, wherein the one or more pairs of dielectric layers comprise alternating layers of a first dielectric material having a first index of refraction and a second dielectric materials having a second index of refraction consecutively arranged, wherein the first index of refraction is higher than the second index of refraction.

21. The apparatus of claim 13, wherein each of the one or more pairs of dielectric layers has a respective optical thickness and the optical thicknesses are determined such that at least one of a blue color, a red color and a green color is reflected.

22. The apparatus of claim 13, wherein each of the one or more pairs of dielectric layers has a respective optical thickness and the optical thicknesses are determined such that said one or more pairs of dielectric layers and said reflective metal layer reflect light waves from an incident light beam, which constructively interfere to increase a reflectance of said surface of said integrated circuit.

23. The apparatus of claim 13, wherein the one or more pairs of dielectric layers comprise four dielectric layers consecutively arranged, each of the dielectric layers having an optical thickness approximately equal to one-fourth of a center wavelength of a visible spectrum.

24. The apparatus of claim 13, wherein each of the one or more pairs of dielectric layers has an optical thickness, each optical thickness determined such that as light waves pass through each dielectric layer of the one or more pairs of consecutive dielectric layers, the light waves undergo a ninety degree phase shift.

25. An apparatus including a liquid crystal light valve, said liquid crystal light valve comprising:

a pixel circuit;

plurality of reflective metal layers disposed on said pixel circuit, said plurality of reflective metal layers including a top reflective metal layer;

a quarter wave stack of dielectric layers disposed on said top reflective metal layer, said quarter wave stack including alternating silicon nitride and silicon dioxide layers; and liquid crystal material disposed directly upon said quarter wave stack of dielectric layers.

26. A method of increasing the reflectance of a pixel circuit, comprising the steps of:

disposing a reflective metal layer on an integrated circuit containing a pixel circuit; and disposing one or more pairs of consecutive dielectric layers on said reflective metal layer; and disposing liquid crystal material disposed directly upon said one or more pairs of dielectric layers.

27. The method of claim 26, further comprising the step of:

etching said one or more pairs of dielectric layers and said reflective metal layer.

28. The method of claim 26, further comprising the step of:

etching said reflective metal layer before disposing said one or more pairs of consecutive dielectric layers on said reflective metal layer.

29. The method of claim 26, wherein said one or more pairs of dielectric layers and said reflective metal layer reflect light waves from an incident light beam which constructively interfere to increase a reflectance of a surface of said pixel circuit.

* * * * *

UNITED STATES PATENT AND TRADEMARK OFFICE
CERTIFICATE OF CORRECTION

PATENT NO. : 6,124,912
DATED : September 26, 2000
INVENTOR(S) : Paul McKay Moore It is certified that error appears in the above-identified patent and that said Letters Patent is hereby corrected as shown below:

Column 9,
Line 56, "Comprises" should read -- Comprise --
Line 57, "four" should be deleted Column 11,
Line 5, the word "four" should be inserted before "dielectric layers"

Signed and Sealed this

Twenty-third Day of October, 2001

Attest:

*Nicholas P. Godici*

NICHOLAS P. GODICI
*Attesting Officer* *Acting Director of the United States Patent and Trademark Office*